July 4, 1939.   T. B. COUGHLIN   2,164,499
FABRIC
Filed June 29, 1936
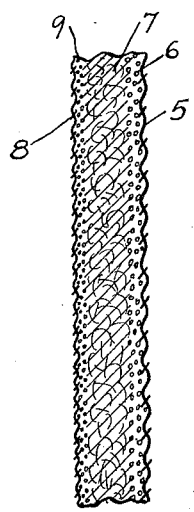
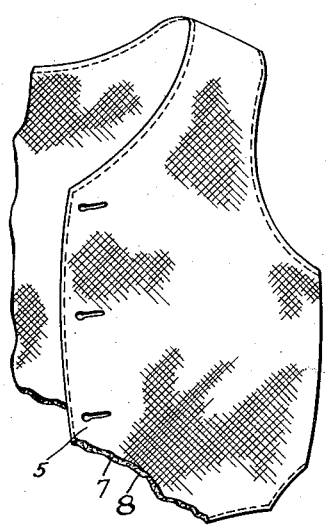
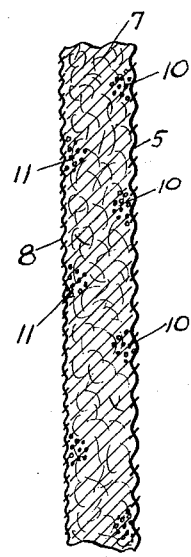
INVENTOR.
THOMAS B. COUGHLIN
BY Herman Seid
ATTORNEY.

Patented July 4, 1939

2,164,499

UNITED STATES PATENT OFFICE 2,164,499

FABRIC

Thomas B. Coughlin, Framingham Center, Mass., assignor, by mesne assignments, to Harry L. Bernstein and James A. Riley, copartners trading as J. A. Riley & Co., New York, N. Y.

Application June 29, 1936, Serial No. 88,015

2 Claims. (Cl. 154—46)

This invention relates to a composite fabric adapted to be used in the manufacture of garments, blankets, and similar articles.

The general object of the invention is to provide an improved flexible composite fabric which is relatively light in weight, relatively inexpensive to manufacture, and which possesses excellent heat insulating properties.

It has been common practise in the past to form composite fabrics of two or more layers of cloth, the layers being secured together in some suitable manner, as, for example, by stitching.

An object of the present invention is to improve upon such composite fabrics as have been known heretofore by the substitution of relatively inexpensive packing material for the relatively expensive cloth heretofore used as a filler in composite fabrics.

Accordingly, it is another object of the invention to provide a composite fabric having an outside layer, preferably of cloth or the like, an inside layer, preferably of cloth or the like, and a filler between the inside and outside layers of relatively inexpensive packing material. The filling material may comprise loose cotton, asbestos fibre, spun glass, wool shoddy, or the like, which substances are generally available at extremely low prices, and which are excellent thermal insulators.

A feature of the invention resides in forming a composite fabric, one element of which is a filling or packing material, another element of which is a backing of cloth or the like, the filler and the backing being joined by a cementitious material which renders the backing impervious to air and moisture.

Another feature of the invention resides in the provision of a composite fabric comprising an outer element of cloth or the like, an inner element of cloth or the like, and a filler comprising wool shoddy, asbestos fibre, spun glass, cotton padding or the like, the various elements being held together by a cementitious material, the outer element being rendered substantially impervious to water and moisture by said cementitious substance, while the inner element is not so impervious, and permits circulation of air to and through the filler.

Another feature of the invention resides in the provision of a composite fabric comprising an outer element of cloth or the like, an inner element of cloth or the like, and a filler comprising wool shoddy, cotton padding or the like, the various elements being held together by the cementitious material through selected portions of their surface areas.

Other objects, features and advantages of the invention will be more apparent from the following description to be read in connection with the accompanying drawing in which:

Fig. 1 is a cross-section taken through a composite fabric in accordance with the invention;

Fig. 2 illustrates a modified form of the fabric of Fig. 1; and

Fig. 3 is a fragmentary view in perspective of a garment made of applicant's improved fabric.

Referring now to the drawing, 5 designates the outer layer of applicant's composite fabric, consisting of a strong and durable cloth preferably made of hemp, flax, cotton or the like. 6 designates a layer of a cementitious substance. 7 represents the filler of loose cotton, wool shoddy, or the like. 8 represents the lining cloth of any suitable material, and 9 represents a layer of cementitious material.

The inner side of the cloth 5 is covered with a relatively thick layer of cement 6. The cement may be of any desired character, but is preferably waterproof and stainless. The impregnation or coating of the cloth 5 by the cement 6 renders the cloth 5 completely or partially impervious, as desired, to air and moisture. The inner side of the lining cloth 8 is covered with a layer of cement 9. The cement 9 may be cement of the same type as indicated at 7, or it may be of a non-waterproofing type. If the cement 9 is waterproof, it is preferable to use a relatively small amount, whereby to prevent the lining cloth 8 from becoming impervious to air. It is necessary that the filler 7 have access to air in order that it may best perform its insulating function. When the fabric is used in a garment, such insulation prevents condensation of moisture evaporated from the body, by insulating the body from the outer atmosphere.

In assembling the elements shown in Fig. 1, the cloth 5 is coated with the cement 6 and the cloth 8 is coated with the cement 7. The applied cement is preferably allowed to dry, and the packing material 7 is then supplied between the cement-coated sides of outer cloth 5 and lining cloth 8. The assembled elements are then subjected to the application of heat which liquefies the cement previously applied to the cloth 5 and the cloth 8. The liquefied cement, particularly the cement from the thick layer 6, permeates filling material 7 and thus binds together particles of the filling 7 while also causing firm adherence between the filling and the cloths 5 and 8. Shifting of the filler 7 is thus effectively avoided. Preferably, but not necessarily, the assembled elements are compressed together, as by rollers, at the same time that they are subjected to the application of heat. In the manufacture of applicant's fabric, it is expedient to use heated rollers which simultaneously heat and compress the elements. If desired, the elements 5, 7, and 8 may be assembled before the cement applied to 5 and 8 has dried; and in this case, the application of heat may be dispensed with.

In Fig. 2 is illustrated a modification of the fabric shown in Fig. 1. The fabric of Fig. 2 differs from that of Fig. 1 in that the cementitious substances are not spread completely over the inner sides of the outer cloth 5 and the inner cloth 8. Instead, the cement is applied to the cloths at selected spots or in strips. Thus, in Fig. 2, the inner side of the cloth 5 is coated with a cementitious substance at the points 10 and the inner side of the cloth 8 is covered with a cementitious substance at the points 11. The points 11 are preferably staggered with respect to the points 10. Thus, when the assembled elements are subjected to heat and pressure, the filler 7 is sufficiently impregnated to prevent its shifting, and the cloths 5 and 8 are caused firmly to adhere to the filler 7, while a relatively great saving in the amount of cement employed is effected.

Fig. 3 illustrates a fragment of a vest formed of a fabric according to the invention, having an outer cloth 5, a lining 8 and a filler 7. Vests and other garments of this type are commonly used by laborers and others of the working classes whose funds are limited. Applicant's invention makes available to such persons garments which are thick and warm, yet not unwieldy, and which are relatively inexpensive.

While applicant's fabric is particularly well adapted for use in garments and the like, its use is not limited thereto. Robes, blankets and the like, constructed in accordance with the invention, will be found highly practicable and desirable.

While the outside and the lining of applicant's fabric have been described as being of cloth or the like, applicant's invention is not limited to such construction. Leathers, imitation leathers, rubber or the like may be used, and the term "cloth" in the claims is to be construed to include these and similar materials. The exact materials used will depend upon the tastes of the users, and the requirements of the service to which the garment or other article made of the fabric, is to be put.

Since many modifications may be made in the invention without departing from the scope thereof, it is intended that the foregoing description and the accompanying drawing shall be regarded as illustrative only, applicant limiting himself only as indicated in the accompanying claims.

I claim:

1. A flexible and pliable composite fabric suitable for use in the manufacture of articles of apparel consisting of a pair of outer layers of flexible and pliable textile fabric, and a filler between said layers, the filler comprising a soft, flexible, pliable and resilient packing of intertwined and loosely matted uncarded textile fibres, the filler being coextensive with said outer layers and being secured to said outer layers by cementitious material, at least one of the layers being waterproofed by said cementitious material, the interior of said filler being substantially free of cementitious material, the fibres of said filler being held together by frictional contact and their intertwining relationship.

2. A flexible and pliable composite fabric suitable for use in the manufacture of articles of apparel consisting of an outer layer, an intermediate layer and an inner layer, said outer and inner layers consisting of flexible and pliable textile fabric, the intermediate layer comprising a soft, flexible, pliable and resilient packing of intertwined and loosely matted uncarded textile fibres, the intermediate layer being coextensive with said outer and inner layers and being secured to said outer and inner layer by cementitious material, the outer layer being secured to said intermediate layer by a continuous coating of cementitious material and being waterproofed by said cementitious material, the inner layer being secured to said intermediate layer by a discontinuous coating of cementitious material, the interior of said intermediate layer being substantially free of cementitious material, the fibres of said filler being held together by frictional contact and their intertwining relationship.

THOMAS B. COUGHLIN.